(12) United States Patent
Kudryavtsev et al.

(10) Patent No.: US 11,068,544 B2
(45) Date of Patent: Jul. 20, 2021

(54) SYSTEMS AND METHODS FOR GENERATING METADATA DESCRIBING UNSTRUCTURED DATA OBJECTS AT THE STORAGE EDGE

(71) Applicant: Marvell International Ltd., Hamilton (BM)

(72) Inventors: Konstantin Kudryavtsev, Sunnyvale, CA (US); Noam Mizrahi, Modi'in (IL); Mats Oberg, San Jose, CA (US); Nedeljko Varnica, San Jose, CA (US); Nitin Nangare, Sunnyvale, CA (US); Igor Polivanyi, Palo Alto, CA (US); Ruwan Ratnayake, San Jose, CA (US); Leo Jiang, Fremont, CA (US); Quynh Chau, Campbell, CA (US); Wen Lung Chang, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 318 days.

(21) Appl. No.: 16/263,387

(22) Filed: Jan. 31, 2019

(65) Prior Publication Data
US 2020/0042557 A1    Feb. 6, 2020

Related U.S. Application Data

(60) Provisional application No. 62/712,823, filed on Jul. 31, 2018, provisional application No. 62/714,563, (Continued)

(51) Int. Cl.
*G06F 16/907* (2019.01)
*G06F 16/901* (2019.01)
(Continued)

(52) U.S. Cl.
CPC .......... *G06F 16/907* (2019.01); *G06F 3/0604* (2013.01); *G06F 3/068* (2013.01); *G06F 3/0638* (2013.01); *G06F 3/0659* (2013.01); *G06F 3/0688* (2013.01); *G06F 12/1054* (2013.01); *G06F 15/17331* (2013.01); *G06F 16/383* (2019.01); *G06F 16/387* (2019.01); *G06F 16/683* (2019.01); *G06F 16/783* (2019.01); *G06F 16/901* (2019.01); *G06F 16/9035* (2019.01); *G06F 16/9038* (2019.01);
(Continued)

(58) Field of Classification Search
CPC .. G06F 16/907; G06F 16/901; G06F 16/9038; G06F 16/9035
USPC .......................................................... 707/736
See application file for complete search history.

(56) References Cited

U.S. PATENT DOCUMENTS

| 6,012,068 A | 1/2000 | Boezeman |
| 6,215,749 B1 | 4/2001 | Kim |
| (Continued) | | |

*Primary Examiner* — Dung K Chau

(57) ABSTRACT

A storage control device coupled to a storage device and located remotely from a host device receives media object data from the host device. The storage control device identifies a type of the media object data and select, based on the identified type, a computational model from among a plurality of computational models for use by a computational engine of the storage control device. The computational engine uses the selected computational model to generate metadata describing the media object data. The metadata is stored in the storage device so as to be selectively retrievable from the storage device separately from the media object data.

20 Claims, 6 Drawing Sheets

Related U.S. Application Data filed on Aug. 3, 2018, provisional application No. 62/716,269, filed on Aug. 8, 2018, provisional application No. 62/726,847, filed on Sep. 4, 2018, provisional application No. 62/726,852, filed on Sep. 4, 2018.

(51) Int. Cl.
| | |
|---|---|
| *G06F 16/9038* | (2019.01) |
| *G06F 16/9035* | (2019.01) |
| *G06F 16/783* | (2019.01) |
| *G06F 16/387* | (2019.01) |
| *G06F 16/683* | (2019.01) |
| *G06F 16/383* | (2019.01) |
| *G06F 3/06* | (2006.01) |
| *G06N 3/08* | (2006.01) |
| *G06F 12/1045* | (2016.01) |
| *G06F 15/173* | (2006.01) |
| *H04L 12/879* | (2013.01) |
| *H04L 29/08* | (2006.01) |

(52) U.S. Cl.
CPC .............. *G06N 3/08* (2013.01); *H04L 49/901* (2013.01); *H04L 67/1097* (2013.01); *G06F 2212/254* (2013.01)

(56) References Cited

U.S. PATENT DOCUMENTS

| | | | | |
|---|---|---|---|---|
| 8,938,492 | B1* | 1/2015 | Kelly | G06F 16/9577 |
| | | | | 709/203 |
| 9,451,329 | B2 | 9/2016 | Whitman et al. | |
| 9,639,969 | B1* | 5/2017 | Wilson | H04L 51/32 |
| 9,966,112 | B1 | 5/2018 | Kulkarni et al. | |
| 10,129,109 | B2 | 11/2018 | Jayanti Venkata et al. | |
| 2004/0143590 | A1* | 7/2004 | Wong | G06F 16/907 |
| 2005/0055406 | A1 | 3/2005 | Singhai et al. | |
| 2006/0047706 | A1 | 3/2006 | Castro et al. | |
| 2007/0386647 | | 2/2007 | Thomas | |
| 2007/0156726 | A1 | 7/2007 | Levy | |
| 2008/0195664 | A1 | 8/2008 | Maharajh et al. | |
| 2009/0132462 | A1 | 5/2009 | Szabo | |
| 2009/0216719 | A1 | 8/2009 | Coffman et al. | |
| 2011/0235858 | A1 | 9/2011 | Hanson et al. | |
| 2012/0265735 | A1 | 10/2012 | McMillan et al. | |
| 2012/0278560 | A1 | 11/2012 | Benzion et al. | |
| 2012/0278705 | A1 | 11/2012 | Yang et al. | |
| 2013/0289991 | A1 | 10/2013 | Eshwar et al. | |
| 2013/0297652 | A1 | 11/2013 | Higgins et al. | |
| 2014/0074855 | A1 | 3/2014 | Zhao et al. | |
| 2014/0122427 | A1 | 5/2014 | Dary | |
| 2014/0250256 | A1 | 9/2014 | Duran | |
| 2014/0270407 | A1 | 9/2014 | Balakrishnan et al. | |
| 2015/0156263 | A1 | 6/2015 | Clayton et al. | |
| 2016/0036882 | A1 | 2/2016 | Jin et al. | |
| 2016/0170871 | A1 | 6/2016 | Hyun et al. | |
| 2016/0191591 | A1* | 6/2016 | Rider | H04N 21/278 |
| | | | | 709/219 |
| 2016/0335339 | A1 | 11/2016 | Venkataraman et al. | |
| 2016/0378402 | A1 | 12/2016 | Amidi et al. | |
| 2017/0094341 | A1 | 3/2017 | Berner et al. | |
| 2017/0169358 | A1 | 6/2017 | Choi et al. | |
| 2017/0185869 | A1 | 6/2017 | Dua et al. | |
| 2017/0193362 | A1 | 7/2017 | Cremer et al. | |
| 2017/0199886 | A1* | 7/2017 | Perrine | G06F 16/435 |
| 2017/0293431 | A1 | 10/2017 | Dor et al. | |
| 2017/0304732 | A1 | 10/2017 | Velic et al. | |
| 2017/0331893 | A1 | 11/2017 | Crofton et al. | |
| 2018/0024770 | A1 | 1/2018 | Lee | |
| 2018/0033208 | A1* | 2/2018 | Martin | H04N 1/00244 |
| 2018/0189615 | A1 | 7/2018 | Kang et al. | |
| 2018/0307609 | A1 | 10/2018 | Qiang et al. | |
| 2019/0138617 | A1 | 5/2019 | Farre Guiu et al. | |
| 2020/0042888 | A1 | 2/2020 | Yu et al. | |

\* cited by examiner

SYSTEMS AND METHODS FOR GENERATING METADATA DESCRIBING UNSTRUCTURED DATA OBJECTS AT THE STORAGE EDGE

CROSS-REFERENCE TO RELATED APPLICATIONS

This disclosure claims the benefit under 35 U.S.C. § 119(e) of commonly-assigned U.S. Provisional Applications Nos. 62/712,823, filed Jul. 31, 2018; 62/714,563, filed Aug. 3, 2018; 62/716,269, filed Aug. 8, 2018; 62/726,847, filed Sep. 4, 2018; and 62/726,852, filed Sep. 4, 2018. Each of the following commonly-assigned United States non-provisional patent applications also claims the benefit of the aforementioned United States Provisional Patent Applications, and is being filed concurrently herewith:

1. U.S. patent application Ser. No. 16/264,473;
2. U.S. patent application Ser. No. 16/264,248;
3. U.S. patent application Ser. No. 16/262,975; and
4. U.S. patent application Ser. No. 16/262,971.

Each of the aforementioned provisional and non-provisional patent applications is hereby incorporated by reference herein in its respective entirety.

FIELD OF USE

This disclosure relates to generation of metadata describing media object data at the storage edge using a computational engine.

BACKGROUND OF THE DISCLOSURE

The background description provided herein is for the purpose of generally presenting the context of the disclosure. Work of the inventors hereof, to the extent that the work is described in this background section, as well as aspects of the description that does not otherwise qualify as prior art at the time of filing, are neither expressly nor impliedly admitted to be prior art against the present disclosure.

Typical systems for generating metadata describing unstructured data, such as media data, may do so at location at which the data is initially received (ingest point), such as an ingest server or other centralized network processing location. The ingest point may be physically collocated with a user of the system or may be a cloud storage location. For example, video data may be received from a camera or other video source at a server that is responsible for both transcoding the media and generating metadata describing the media. These systems typically embed the metadata in a media data stream with the received or transcoded media data so as to require retrieval of the entirety of the media data in order to access all metadata describing the media data. This can result in an increased load at the ingest point due to volume of media data to be processed in order to embed or otherwise include the metadata therein. Typical systems generate metadata describing media data at the ingest point or at a centralized server. This can result in an increased amount of data to be transferred from the ingest point of centralized server to storage and, consequently, an increase in network bandwidth required to perform the storage operation. For example, large amounts of data may need to be transmitted between remotely located processing and storage locations.

SUMMARY

Implementations described herein provide an apparatus and method for storing and managing media object data. A storage control device coupled to a storage device and located at a storage edge remotely from a host device receives media object data from the host device. The storage control device identifies a type of the media object data and selects, based on the identified type, a computational model from among a plurality of computational models for use by a computational engine of the storage control device. The computational engine uses the selected computational model to generate metadata describing the media object data. The metadata is stored in the storage device so as to be selectively retrievable from the storage device separately from the media object data.

In some implementations, the storage control device accesses the media object data using a data input interface. Each computational model has associated input data interface parameters which identify a data format for which the computational model is configured. The storage control device accesses the media object data using the input data interface parameters and converts the media object data to the identified data format.

In some implementations, each computational model has associated hardware interface parameters. The storage control device retrieves the hardware interface parameters and applies the hardware interface parameters to a hardware interface. The storage control device accesses the media object data from a first physical connection using the hardware interface, and stores the media object data and metadata in the storage device through a second physical connection using the hardware interface.

In some implementations, each computational model has associated decryption parameters. The storage control device retrieves the decryption parameters and decrypts the media object data using the decryption parameters.

In some implementations, the storage control device retrieves media object data from the storage device for which metadata has already been generated using a first computational model. The storage control device identifies the first computational and selects a second computational model to generate second metadata different from the first metadata. The storage control device may store the second metadata so as to be selectively retrievable from the first metadata and from the media object data. The storage control device may combine the first and second metadata to generate combined metadata and store the combined metadata so as to be selectively retrievable from the media object data.

In some implementations, the storage control device receives a request from the host device for media data containing objects which meet one or more criteria. In response to this request, in some implementations, the storage control device retrieves, from the storage device, the metadata describing media object data separately from the media object data. The storage control device identifies, based on the retrieved metadata, one or more portions of the media data that contain objects which meet the one or more criteria. The storage control device then retrieves, from the storage device, the identified portions of the media data containing objects which meet the one or more criteria, and responds to the request from the host by sending the retrieved portions of media data over a network connection without sending other portions of the media.

In some implementations, the storage control device generates a copy of the media object data and concurrently provides the media object data to the storage device for storage and provides the copy of the media object data to the computational engine for processing to generate metadata.

In some implementations, the storage control device stores the media object data in a logically separated manner so as to be selectively retrievable separately from one another.

BRIEF DESCRIPTION OF THE DRAWINGS

Further features of the disclosure, its nature, and various advantages will become apparent upon considerations of the following detailed description, taken in conjunction with the accompanying drawings, in which like reference characters refer to like parts throughout, and in which.

DETAILED DESCRIPTION

Figure 1:
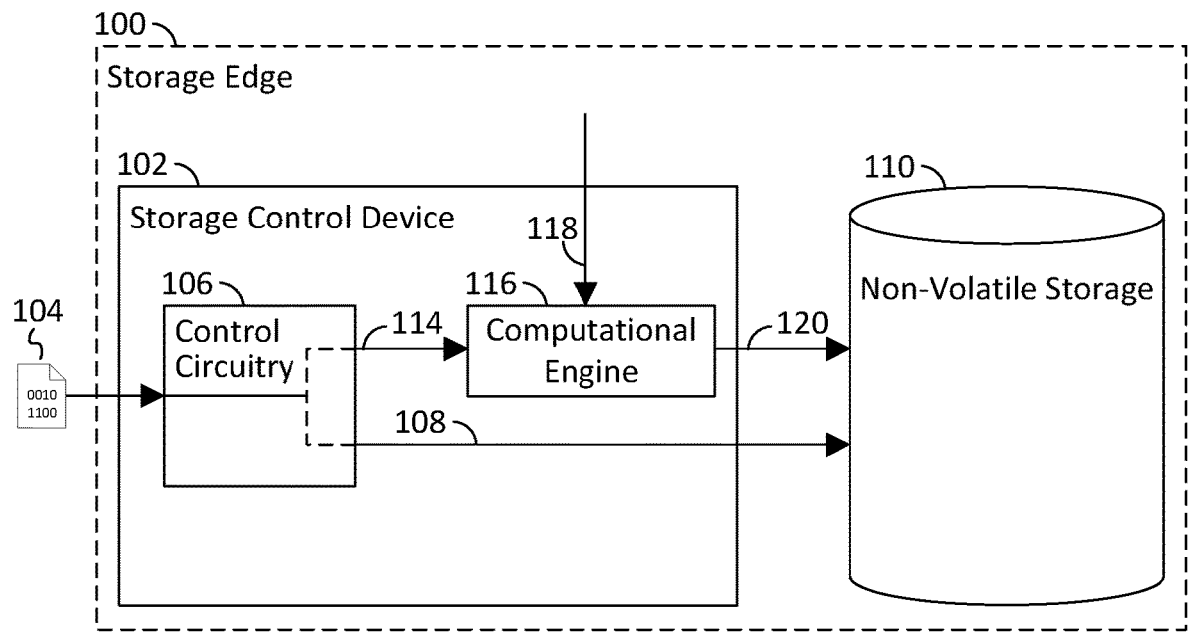
FIG. 1 is a block diagram illustrating components and data flow therebetween for generating metadata describing unstructured data objects in accordance with some implementations of the disclosure.

Implementations described herein provide an apparatus and method for generating metadata describing unstructured data objects at the storage edge. The storage edge refers to an environment that is local to a storage device such as one or more solid-state storage drives or hard disk drives. A storage control device located at the storage edge is used to control storage and retrieval of data at one or more storage devices. Each storage device may be coupled to, and controlled by, a respective storage control device. Alternatively, several storage devices may be coupled to, and controlled by, a single storage control device, such as a storage aggregator as described in above-incorporated U.S. patent application Ser. No. 16/264,248. The storage control device receives an unstructured data object, such as a media object for which descriptive metadata has not yet been generated. Control circuitry of the storage control device identifies a type, such as a data type, of the data object. Based on the type, a computational model is selected from among a plurality of computational models. A computational engine, for instance a computational engine that is local with respect to the storage edge or the storage device, uses the selected computational model to generate metadata describing the data object. The storage control device provides the metadata to the storage device for storage within or in association with the data object so as to be selectively retrievable separately from the data of the data object. The metadata may be embedded into the data object in a header or other discrete portion of the data object which can be retrieved separately from the data object. For example, the data object may include video data and the metadata may be generated as a text file. The storage control device combines the metadata text and video data into a single file having a logically separated text portion and video portion. The metadata can then be separately retrieved by accessing only the text portion of the file. Alternatively, the metadata may be interleaved with the data of the data object. For example, each keyframe contained in the video data includes some metadata describing the portion of the video data to which the respective keyframe applies. As a third alternative, the metadata may be stored in a physically separate storage device or may be stored in a logically separate portion of the storage device in which the data object is stored. For example, the data object may be stored in a first solid-state drive and the metadata may be stored in a second solid-state drive. As another example, the data object may be stored in a first partition of a solid-state drive and the metadata may be stored in a second partition of the same solid-state drive. Any other suitable physical or logical separation of data may also be used.

This disclosure describes methods and systems for generating metadata describing an unstructured data object at the storage edge and storing the metadata so as to be selectively retrievable separately from the data of the data object. A storage control device includes control circuitry and a computational engine, such as a suitable artificial intelligence (AI) or machine learning (ML) engine. The storage control device is located at the storage edge and receives unstructured data, such as media objects, to be stored in a storage device. The storage control device generates metadata for the media data of unstructured media objects and stores the metadata in the storage device so that it is selectively retrievable separately from the unstructured media data.

As used herein, the term "storage edge" means a module or a component that is local to a non-volatile storage device. For example, a controller that controls the operation of one or more storage devices to store or retrieve data at one or more instances of a non-volatile memory is disposed on storage edge. The storage edge is found for example in dedicated storage devices, or at storage networks, and is separated from a processor that is remotely located, for instance in a host computer or at a data center. Communication between the storage edge and a remote is host is over a computer network connection.

As used herein, the terms "media data objects," "data objects," "media objects" or "objects" mean various types of data that is issued by an application running on a host system and can be stored on a storage device. Examples of "media objects" or "objects" can include, but not limited to videos, sound recordings, still images, textual objects such as text messages and e-mails, data obtained from various types of sensors such as automotive sensors and Internet-of-Things (IoT) sensors, database objects, and/or any other suitable objects. In many cases, the media objects are unstructured. As used herein, the term "unstructured object" means that the media content ("content media data") of the object (e.g., textual content, audio content, image content or video content) is provided in raw form and is not organized in advance according to a fixed field format. An unstructured object is not tagged a-priori with metadata that defines any aspects of the content per frame or other content portion. Unstructured data is non-transactional, and its format does not readily conform to a relational database schema.

As used herein, the term "metadata" refers to a high-level representation of the actual data content of media objects stored in a non-volatile storage device. The "metadata" can be an abstraction layer of the actual data content, which gives a description or a meaning of data content in a compact format. Metadata can be generated from media objects, which are almost always unstructured, in various ways. Example metadata can include labels, tags, types of data, objects/concepts/sentiments detected in data content, spatial/temporal locations of such objects/concepts/sentiments within the data content, etc.

As used herein, the term "artificial intelligence (AI) model" refers to any suitable AI algorithm, e.g., implemented on a deep neural network or any recurrent neural network or any variation of those. In some implementations, an AI model is suitably any other Supervised learning or Unsupervised Learning or Reinforcement learning algorithms. An AI model is trained using a "training set"—a body of media objects and corresponding metadata that is known to be accurate. The trained AI model is then applied to generate metadata for other media objects. A software or hardware module that receives a pre-trained AI model and uses it to compute metadata of objects is referred to herein as an "AI engine" or "AI interface engine." In some implementations, several different AI models will be applied to unstructured or partially structured media objects.

In accordance with one aspect of the disclosure, the storage control device receives the unstructured data from a host device over a network, such as a local area network (LAN) or a wide area network (WAN) using Internet or other suitable networking protocols. Alternatively, unstructured data is received from a capture device (e.g., video recorder, audio recorder, sensor) locally connected to a computer. In such implementations, the storage control device is incorporated into the storage device of the computer and receives data over a bus from other portions of the computer. The storage control device creates a copy of the data object and stores the original data object in the storage device while using the computational engine to generate the metadata using the copy. After generating the metadata, the copy of the data object is no longer required. The metadata is stored in a selectively retrievable manner from the unstructured data, and the copy of the data object is deleted, marked for deletion, overwritten, or otherwise removed from the storage control device.

Metadata is stored separately from the unstructured data, as described below, in order to facilitate selective retrievability of the metadata without requiring retrieval of the associated unstructured data. For example, metadata and unstructured data may be stored in one or more logically separable portions of a data file or other data structure. In an implementation, the one or more portions containing metadata are structured as self-contained data files which can be accessed and read by the storage control device outside the context of the unstructured data. Additionally, the one or more portions containing metadata may be tagged or otherwise identified within the data file or data structure to allow the storage control device to easily locate and retrieve them. Further, the metadata identifies or otherwise includes an association with the unstructured data which it describes. This allows the storage control device to retrieve relevant portions of the unstructured data based on a review or analysis of the metadata. This and other implementations are further described in above-incorporated U.S. patent application Ser. No. 16/262,971.

Storage of the metadata in a selectively retrievable manner from the unstructured data may allow greater efficiency in indexing and searching functions. Rather than having to parse metadata out of the unstructured data objects, a search engine or indexer can access or selectively retrieve the metadata describing objects, without having to retrieve the media data. This selective retrieval reduces the amount of data needed to be accessed in order to retrieve metadata or relevant portions unstructured data objects, and reduces processor load when performing search or indexing functions, or retrieval of relevant portions of previously unstructured data such as relevant portions of media objects.

Generating metadata at the storage edge rather than at the host device also results in less data to be transferred between host devices, processors and the storage edge, which in turn results in faster overall data transfer speeds, either from the ingest point or a central data processing center. For example, when metadata is generated at the ingest point, data processing center, or a cloud server (i.e., locations remote to the storage edge), unstructured media data containing data objects must be transferred to the storage edge, and at times from a storage device to a remote processor, for instance at remote data center, to identify and/or tag various objects in the media. This entails transferring tremendous amounts of data over a computer network, impacting available bandwidth in the network and requiring considerable time, and ultimately affecting overall network speed and/or performance. By moving generation of the metadata to the storage edge, metadata can be readily generated for significantly larger volumes of unstructured data, thus facilitating the identification of relevant portions of stored unstructured content media data using metadata. Larger volumes of content media can be filtered for relevant segments and the relevant segments can be transferred from the storage device, without transferring entire voluminous bodies of unstructured content media data from storage to a data center facility over a computer network. This facilitates a significant reduction in the quantity of content media data that needs to be transferred as well as the ability to more quickly pinpoint and review only those segments of content media data that are relevant. Therefore, the amount of time required to make relevant portions of the unstructured data available for retrieval from the storage edge is reduced by the difference between the amount of time needed to transfer to a data center facility large volumes of content data media needed to generate metadata using computational engines at the data center on the one hand, and the amount of time needed to transfer to the data processing facility relatively small amounts of data containing both metadata generated at the storage edge and those segments of content data that are relevant to address a particular need. For example, metadata is generated for surveillance video to tag the moods of people captured in the surveillance video, or the presence of specific people or activities captured in the surveillance video. Only the relevant frames with the desired persons, moods or activities may need to be sent (e.g., to a data processing center or to a human operator) for further analysis. As another example, metadata is generated for audio recordings to tag specific speech sequences, such as segments of a conversation made at a robotic service desk. The metadata is searched for specific speech sequences and only the relevant recording portions containing the relevant sequences, instead of an entire recording, are sent to a facility where they are analyzed and used to improve robot response in an automated conversation.

In accordance with another aspect of the disclosure, previously received unstructured data, for which metadata was previously generated using a first computational model, is retrieved from the storage device. Second metadata is generated for the retrieved unstructured data using a second computational model that is different from the first computational model. The second computational model may be an updated version of the first computational model which more accurately generates the same type of metadata as the first computational model. The second metadata is compared with the first metadata and any metadata of the second metadata that is different from corresponding metadata of the first metadata or any metadata of the second metadata not present in the first metadata are stored. Alternatively, the second computational model may be configured to generate a different type of metadata than the first computational model. The second metadata may also be stored to be selectively retrievable separately from both the previously stored unstructured data as well as previously generated first metadata. Alternatively, the second metadata is merged with the first metadata and the merged metadata is stored to be selectively retrievable separately from the previously stored unstructured media.

FIG. 1 is a block diagram illustrating components and data flow therebetween for generating metadata describing unstructured data objects in accordance with some implementations of the disclosure. Storage control device 102 is located at the storage edge 100. An unstructured data object 104 is received at the storage control device from a host device, such as an audio recorder, video recorder, imaging sensor (e.g., infrared sensor), environmental sensor (e.g., thermometer), motion sensor (e.g., accelerometer, radar, lidar), or a server at which data from any such recorder or sensor is first received (an "ingest server"), over a network.

In some implementations, control circuitry 106 is configured to receive, retrieve, or access the unstructured data 104 using an input data interface. The input data interface is configurable to access various types of unstructured data as needed. Configuration of the input data interface can be achieved by applying input data interface parameters to the input data interface. As described below in connection with FIG. 6, input data interface parameters may be stored in association with a particular computational model configured to process unstructured data of a particular format. If the unstructured data 104 is received in a format other than the particular format, control circuitry 106 is configured to convert the unstructured data 104 to the particular format to facilitate generation of metadata describing the unstructured data. For example, video data may be received in a compressed format, such as H.262, while the computational model is configured to process H.264 video data. The input data interface parameters identify a set of video compression formats which can be converted to the required H.264 format and may additionally supply a format conversion tool for use by control circuitry 106 to convert the video data to the H.264 format. As another example, image data may be received in JPEG format while the computational model is configured to process images in a bitmap format. The input data interface parameters identify JPEG as a suitable input format for conversion to a bitmap format, and provide a conversion tool for use by control circuitry 106.

In some implementations, control circuitry 106 may receive, retrieve, or access unstructured data 104 using a hardware interface. The hardware interface is configurable to access data from various physical or logical ports and/or connections of the storage control device 102. Configuration of the hardware interface can be achieved by applying hardware interface parameters to the hardware interface. As described below in connection with FIG. 6, hardware interface parameters may be stored in association with a particular computational model. In response to selection of a particular computational model (e.g., in response to instruction 118, which may be received prior to receipt of the unstructured data), control circuitry 106 applies the hardware interface parameters to the hardware interface. The hardware interface parameters may specify a particular logical port of a network connection, such as TCP port 20 (FTP), 80 (HTTP), or 115 (SFTP). The hardware interface parameters may specify a physical port or connection, such as an ethernet port, serial port, USB port, or other data port through which the storage control device 102 may receive unstructured data. The hardware interface listens to the specified port and allows control circuitry 106 access to data received through the specified port.

In some implementations, unstructured data 104 is encrypted for transmission to the storage edge. To allow processing of the unstructured data 104, control circuitry 106 decrypts the unstructured data 104 using decryption parameters. As described below in connection with FIG. 6, decryption parameters may be stored in association with a particular computational model. In response to selection of a particular computational model (e.g., in response to instruction 118, which may be received prior to receipt of the unstructured data), control circuitry 106 retrieves the decryption parameters. Decryption parameters may include a predefined decryption key or decryption key generation routine such as an RSA algorithm. Control circuitry applies the decryption key or generates and applies a decryption key using the RSA algorithm to access the unstructured data 104.

Upon accessing or receiving unstructured data 104, control circuitry 106 of storage control device 102 creates two identical data streams. A first data stream contains the unstructured data 104 as originally received, and a second data stream contains an identical copy of the unstructured data 104 generated by control circuitry 106. Control circuitry 106 then stores the first data stream 108 in non-volatile storage 110. Non-volatile storage 110 may be any non-volatile data storage device, such as a hard drive, Flash memory array (e.g., NOR-Flash memory or NAND-Flash memory), or any other suitable type of data storage medium. The above-described decryption and/or format conversion may be performed on the unstructured data 104 as initially received, or on only the second data stream to be processed by computational engine 116.

Control circuitry 106 also determines a data type of the unstructured data, such as video data, image data, audio data, or any other data type. Control circuitry 106 directs the second data stream 114, which is identical to data stream 108, to a computational engine 116 of the storage control device 102. Computational engine 116 generates metadata using a computational model. For example, computational engine 116 may be a machine learning, artificial intelligence or other suitable metadata generating engine. Computational models used by computational engine 116 may be AI models and may employ matrix multiplication operations, convolutional operations, other operations defined in neural networks, or any other suitable data processing methods or operations. Storage control device 102 selects a computational model to be used by computational engine 116 and transmits an instruction 118 to computational engine 116 to use the selected model. Storage control device 102 selects a computational model corresponding to the determined data type, or a type of metadata that is desired to be extracted from the content. For example, some computational models are suitable for identifying faces in an image frame or voices in a segment of a sound recording, while other computational models are designed, for example, to identify an action or a mood of a person in an image frame. Some computational models identify a location of an object within a frame or a stream of data. Some computational models are configured to identify a plurality of different characteristics of segments of the media data.

Computational engine 116 processes the copy of the unstructured data, in an implementation, to segment the unstructured data into frames, generate metadata describing, for instance, content and locations of the content in the unstructured data. The metadata 120 is then stored in non-volatile storage 110 to be selectively retrievable separately from the unstructured data, as described below in connection with FIGS. 3 and 4. This may allow for greater efficiency in indexing and searching functions in the metadata to, for example, extract relevant segments of content media data.

In some implementations, the above-described storage of media data and metadata in non-volatile storage 110 is achieved using the hardware interface configured using the above-described hardware interface parameters, which may further specify a particular port or connection through which the storage control device 102 is to store the media object data and metadata in non-volatile storage 110. For example, the hardware interface parameters may specify a physical or logical address of a particular server or data storage device in which to store the media object data and metadata. Alternatively, or additionally, the hardware interface parameters may specify a particular port, such as an ethernet port, serial port, USB port, or other data port through which storage control device 102 may access non-volatile storage 110.

Figure 2:
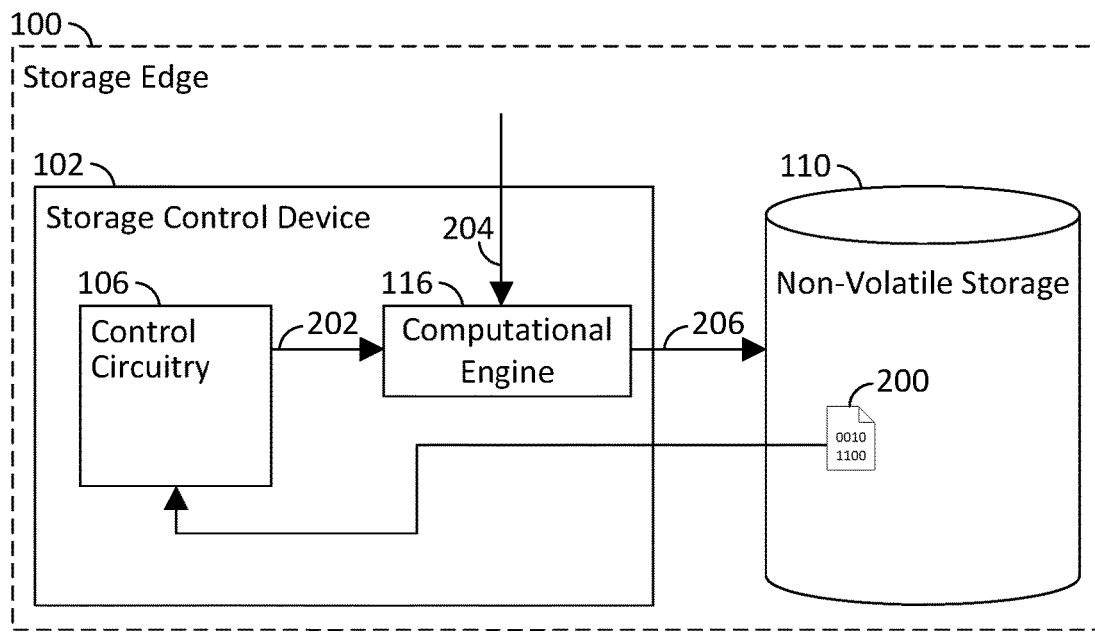
FIG. 2 is another block diagram illustrating components and data flow therebetween for generating metadata describing unstructured data objects in accordance with some implementations of the disclosure.

FIG. 2 is another block diagram illustrating components and data flow therebetween for generating metadata describing unstructured data objects in accordance with some implementations of the disclosure. If no metadata has been generated for an unstructured data object that has already been stored in non-volatile storage 110, or if additional metadata is to be generated for an unstructured data object, the storage control device 102 retrieves the content media data 200 from non-volatile storage 110. Control circuitry 106 identifies a data type of the media data 200, as described above in connection with FIG. 1. Control circuitry 106 provides content media data 202 to computational engine 116 for processing. In some scenarios the content data is unstructured, while in other scenarios the content has been partially structured with partial metadata having been previous generated for the content. Storage control device 102 selects a computational model and transmits an instruction 204 to computational engine 116 to use the selected computational model. As described above in connection with FIG. 1, storage control device 102 selects a computational model based on the determined data type of media data 200. If metadata describing the unstructured data object already exists, control circuitry 106 determines a first computational model that was used to generate the metadata and selects a second computational model to be used. For example, metadata may have already been generated using a computational model for identifying faces in surveillance video. Control circuitry 106 may select, as a second computational model, a computational model for identifying facial expressions, actions, moods, or voices in the same surveillance video. The metadata 206 generated using the second computational model is then stored in non-volatile storage 110 to be selectively retrievable separately from the unstructured data, as described below in connection with FIGS. 3 and 4. The metadata generated using the first computational model and the metadata generated using the second computational model may be stored separately from one another in order to be selectively retrievable. Alternatively or additionally, the metadata generated using the second computational model may be combined with the metadata generated using the first computation model to generate a single set of metadata to be stored in a selectively retrievable manner separately from the unstructured data.

Figure 3:
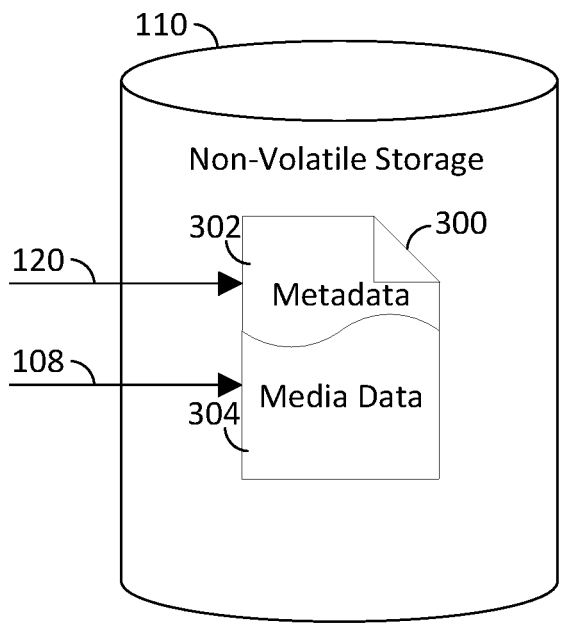
FIG. 3 is a block diagram illustrating storage of metadata and media data in a non-volatile storage device in accordance with some implementations of the disclosure.

FIG. 3 is a block diagram illustrating storage of metadata and media data in non-volatile storage 110 in accordance with some implementations of the disclosure. Metadata and media data are stored within a single data file 300 in non-volatile storage 110. Data file 300 is of a file format which can host both text-based metadata and unstructured media data in a metadata portion 302 and a media data portion 304, respectively. Data stream 108, containing unstructured media data, is received at non-volatile storage 110 and data file 300 is created to contain the unstructured media data, for example in media data portion 304. Metadata 120, generated by computational engine 116, is also received at non-volatile storage 110. Non-volatile storage 110 stores the metadata in metadata portion 302 of data file 300. In an implementation, metadata portions 302 are stored separately from the media data portions 304. In another implementation, respective metadata portions 302 and media data portions 304 are stored together, for instance interleaved, but so as to be mutually separable. Data file 300 may be created with both metadata portion 302 and media data portion 304. Alternatively, if the unstructured media data 108 is received at non-volatile storage 110 before metadata 120, data file 300 may be created with only media data portion 304 and, upon receipt of metadata 120, metadata portion 302 may be appended to, prepended to, concatenated or interleaved with media portion 304. By storing metadata 120 to be separable from media data 108, metadata 120 can be selectively retrievable separately from media data 108, which in turn results in increased efficiency in accessing metadata 120, or specific portions of media data 108 based on metadata 120, as described above.

Figure 4:
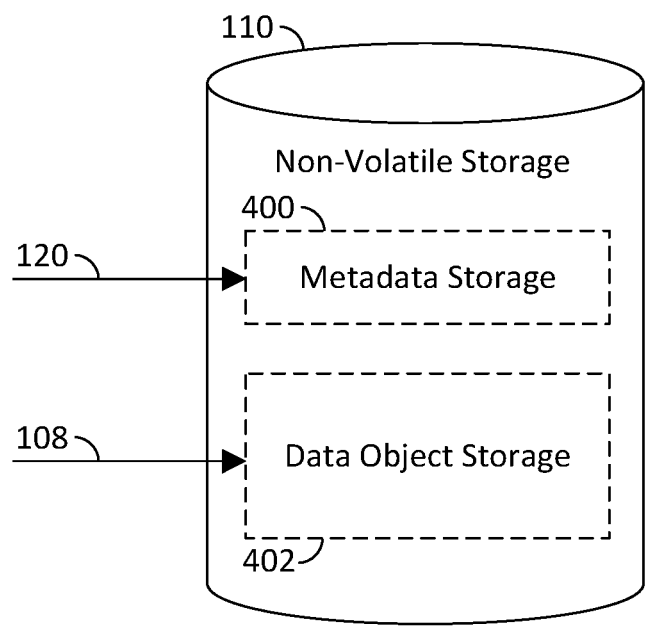
FIG. 4 is another block diagram illustrating storage of metadata and media data in a non-volatile storage device in accordance with some implementations of the disclosure.

FIG. 4 is another block diagram illustrating alternative storage of metadata and media data in non-volatile storage 110 in accordance with some implementations of the disclosure. Non-volatile storage 110 may include physically separate storage areas (e.g., several hard disk drives or solid-state drives) or logically separate storage areas (e.g., several partitions on a single hard disk or solid-state drive). Non-volatile storage 110 may designate a first storage area 400 for metadata storage and a second storage area 402 for data object storage. Data stream 108 is received at non-volatile storage 110. Non-volatile storage 110 determines that the received data stream 108 contains unstructured media data and stores the unstructured media data in data object storage 402. Non-volatile storage 110 also receives metadata 120, generated by computational engine 116. Non-volatile storage 110 determines that the data received is text-based metadata and stores the metadata 120 in metadata storage 400. As above, storage of metadata 120 to be separable from media data 108 allows for metadata 120 to be retrievable separately from media data 108, which in turn results in increased efficiency in accessing metadata 120, or specific portions of media data 108 based on metadata 120.

Figure 5:
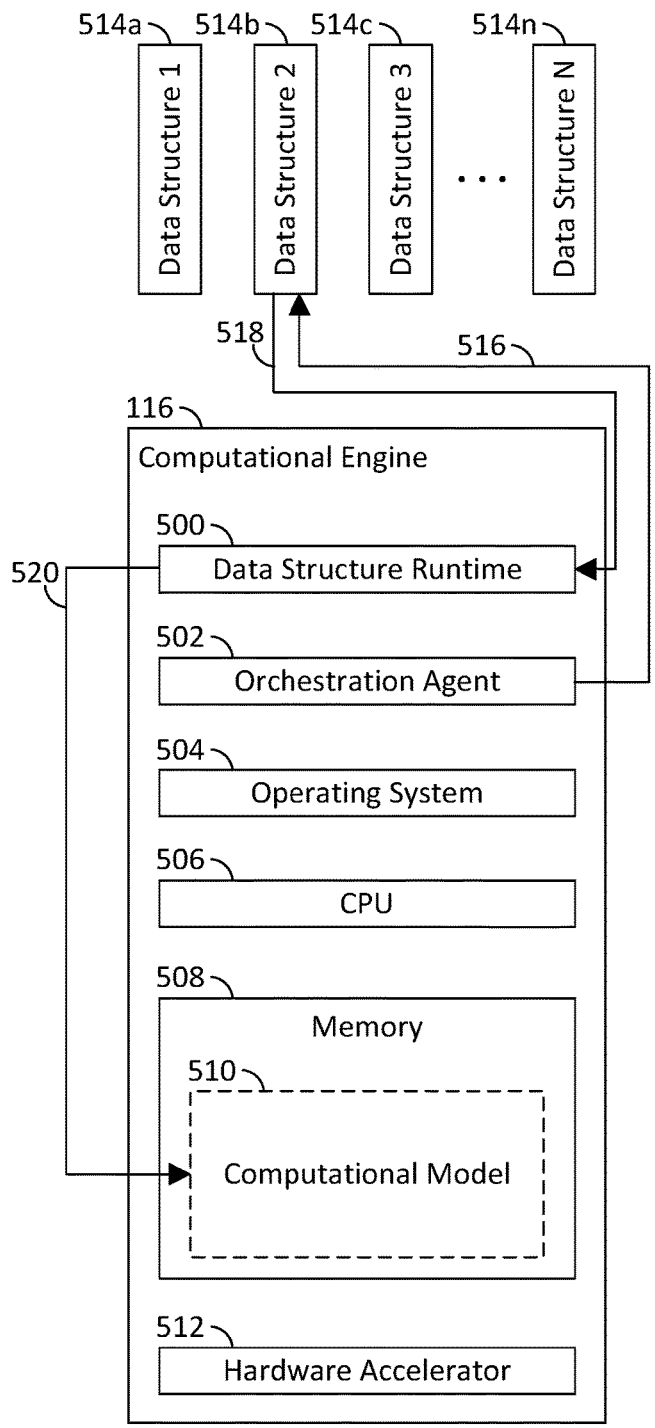
FIG. 5 is a block diagram illustrating components of a computational engine in accordance with some implementations of the disclosure.

In some implementations, computational models are stored in respective data structures in a memory of the storage control device 102. Computational engine 116 or control circuitry 106 extracts the selected computational model from its respective data structure for use by computational engine 116. FIG. 5 is a block diagram illustrating components of a computational engine in accordance with some implementations of the disclosure. Computational engine 116 includes a data structure runtime module 500. Data structure runtime module 500 provides an environment in which the contents of a data structure can be executed by or applied to the computational engine 116. Additionally, data structure runtime module 500 allocates virtual system resources needed for the particular data structure. In other words, data structure runtime module 500 provides an application layer in which the contents of the data structure, as described below in connection with FIG. 6, can be executed using hardware of the computational engine 116, such as CPU 506 and hardware accelerator 512. Computational engine 116 also includes orchestration agent 502. While the data structure runtime module 500 is responsible for executing a data structure (such as data structure 514*n* as described below in connection with FIG. 6), orchestration agent 502 determines which data structure to execute. Orchestration agent 502 receives a command, such as instruction 118, to select a particular data structure, or receives an indication of the determined data type of the unstructured data object to be processed and determines an appropriate data structure. Orchestration agent 502 transmits a request 516 to a memory of the storage control device 102 to retrieve a data structure (e.g., data structure 514*b*) from among a plurality of data structures (514*a*, 514*b*, 514*c*, . . . 514*n*). The memory of storage control device 102 transmits response 318 containing the selected data structure 514*b*, which is then loaded by computational engine 116 into data structure runtime module 500.

Data structure runtime module 500 extracts a computational model from data structure 514*b*. Data structure runtime module 500 loads the extracted computational model 520 into a volatile memory 510 of the computational engine 116. Data structure runtime module 500 may also extract other data and parameters from the selected data structure needed to process the media data using the extracted computational model 520. Computational engine 116 includes an operating system 504, running on a CPU 506, in an implementation, through which the data structure runtime module 500 and orchestration agent 502 perform the actions described above.

In an implementation, computational engine 116 further includes a hardware accelerator 512. Computational models include many thousands of operations which cannot be efficiently executed on CPU 506. Computational engine 116 runs the extracted computational model using the hardware accelerator 512.

Figure 6:
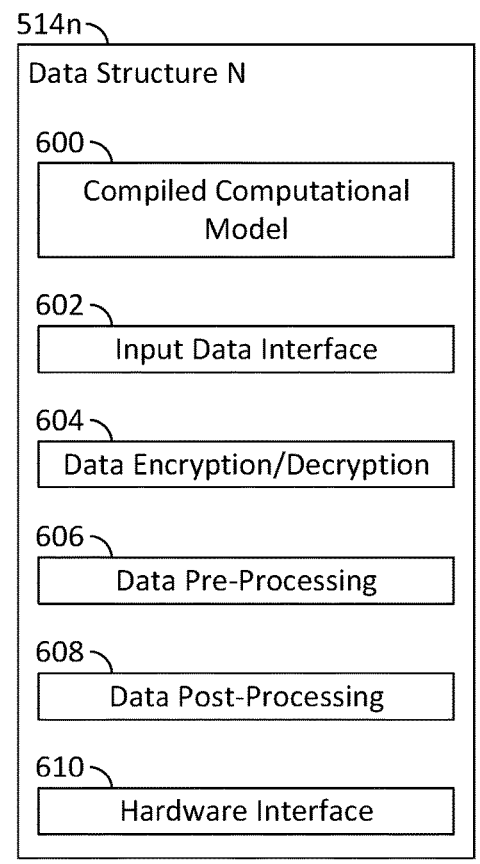
FIG. 6 is a block diagram illustrating components of a data structure from which a computational model is extracted in accordance with some implementations of the disclosure.

FIG. 6 is a block diagram illustrating components of a data structure from which a computational model is extracted in accordance with some implementations of the disclosure. In some implementations, in addition to a compiled computational model 600, data structures, such as data structure 514*n*, include several other items and parameters which may be used by computational engine 116 in processing unstructured data objects. For example, input data interface 602 provides parameters for input format of the unstructured data. For example, the computational model contained within a particular data structure may be configured to process images in a bitmap-type format. If the media object data supplies images in a compressed format, such as JPEG, the computational engine 116 must convert the compressed images to bitmaps. Media object data may be encrypted. For example, the media data may be subject to security concerns or copyright. Data encryption/decryption 604 provides encryption or decryption algorithms and keys needed to access the unstructured data, for example by decrypting the data. Data pre-processing module 606 provides mechanisms for preparing the unstructured data for processing, such as conversion of the unstructured data as required by the input data interface 602 as described above. Additionally, data pre-processing module 606 may provide mechanisms for extracting individual video frames or audio samples from the media object data. Data post-processing module 608 provides parameters for formatting of the metadata generated by the computational model 600, in an implementation. For example, data post-processing module provides a particular data structure and/or data fields in which metadata relating to the media object data is to be placed. The data structure or data fields are specific to both the type of data being processed and the configuration of the compiled computational model 600. Hardware interface 610 provides parameters for accessing the data using particular components, such as a network interface or a serial data connection.

Figure 7:
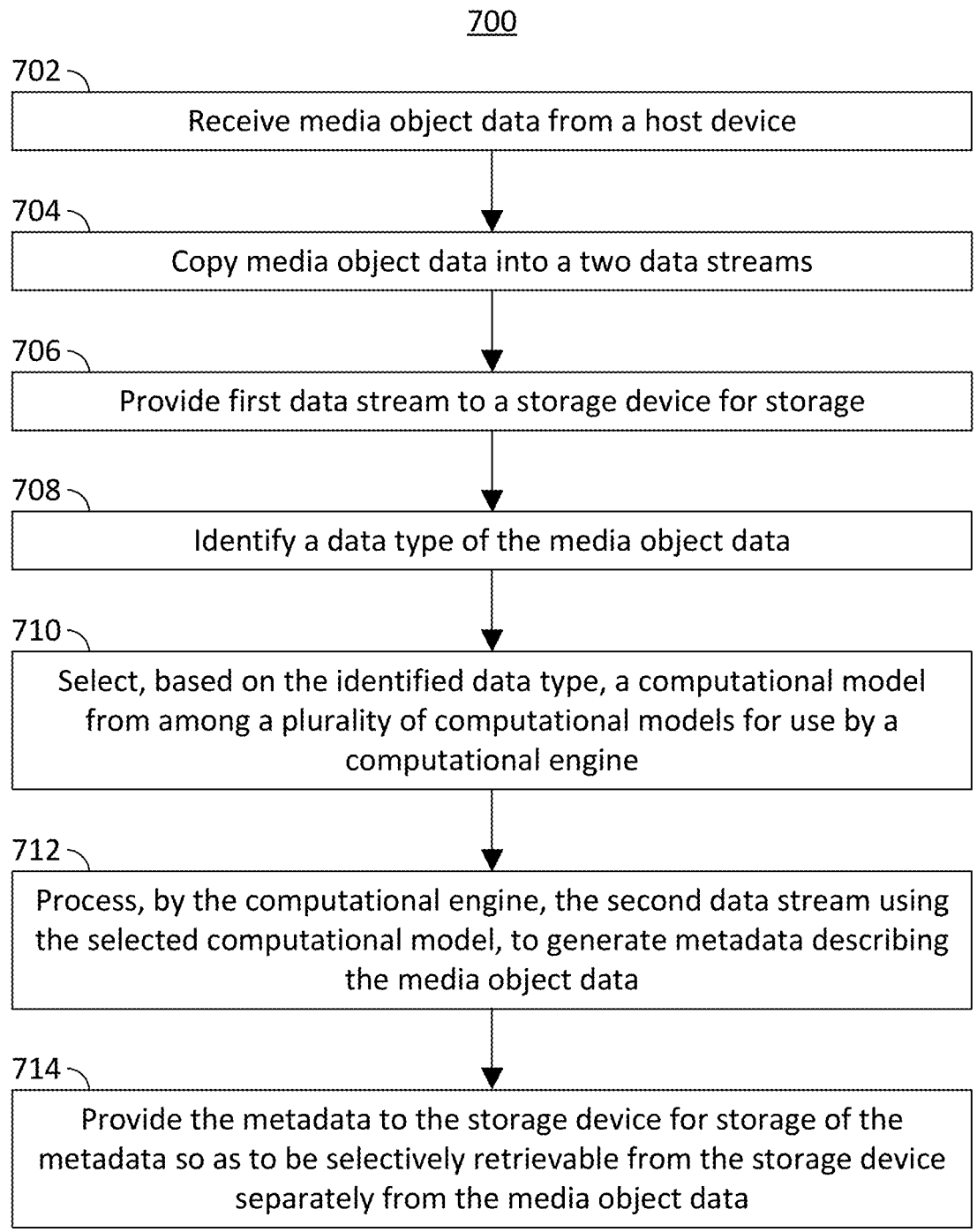
FIG. 7 is a flowchart representing a process for generating metadata describing an unstructured data object in accordance with some implementations of the disclosure.

FIG. 7 is a flowchart representing a process 700 for generating metadata describing an unstructured data object in accordance with some implementations of the disclosure. As a non-limiting example, the unstructured data object is a content media data object. At 702, storage control device 102, using control circuitry 106, receives the media object from a host device. For example, control circuitry 106 may include a network interface or other data input connection through which data is received from remote sources. Remote sources include any host device or server at which the media object is generated and/or transmitted to the storage edge, such as a video recorder, audio recorder, ingest server, cloud server, and the like. Performing metadata generation at the storage edge for data received or already present at the storage edge, rather that data stored at a data storage center or distributed storage system (i.e., cloud storage) results in significant reductions in the volume of data needed to be transferred across a network. In some implementations, the storage control device 102 may receive, from the host device, a request to store the media object data in non-volatile storage 110. At 704, control circuitry 106 creates a copy of the media object data, thereby resulting in two data streams containing the same content data. At 706, control circuitry 106 provides one data stream to non-volatile storage 110 for storage. At 708, control circuitry 106 identifies a data type of the media object data. For example, the media object data may be a video stream. Control circuitry 106 may process, examine, or otherwise inspect packet headers to determine the type of data received from the host device. Control circuitry 106 may further determine a data format, such as MPEG-2, MPEG-4, or other video data formats. As another example, the media object data may be an audio stream. Control circuitry 106 may process, example, or otherwise inspect packet headers to determine the type of data received, and may further determine a data format, such as MP3, WAV, or other suitable audio data format. As a third example, the media object data may be sensor data capture from an imaging sensor such as an infrared sensor. Control circuitry 106 may identify the type of sensor from packet header data, such as a signature of the sensor.

At 710, control circuitry 106 selects, based on the identified data type, a computational model from among a plurality of computational models for use by the computational engine 116. For example, control circuitry 106 selects a computational model for performing image processing on successive frames of video data to identify objects depicted in each frame. In some implementations, selection of a computational model by control circuitry 106 is further based on the type of metadata desired to be generated. For example, several computational models may be available for processing video data, each generating a different set of metadata. One computational model may identify faces in video data while another computational model identifies actions in video data. Control circuitry 106 may receive input from a user or from a program running at the storage edge to generate a specific type of metadata. Control circuitry 106 therefore selects a computational model configured to process video data and to generate the desired metadata. Additional concepts are described in above-incorporated U.S. patent application Ser. No. 16/262,971.

At 712, the computational engine 116 processes the second data stream using the selected computational model to generate metadata describing the media object data. At 714, control circuitry 106 provides the metadata to non-volatile storage 110 for storage so as to be selectively retrievable from non-volatile storage 110 separately from the media object data, using methods described above in connection with FIGS. 3 and 4. Thus, the metadata can be retrieved separately from the media object data, thereby enabling the process described above to retrieve only the metadata generated by the first computational model independently of the media object data.

Figure 8:
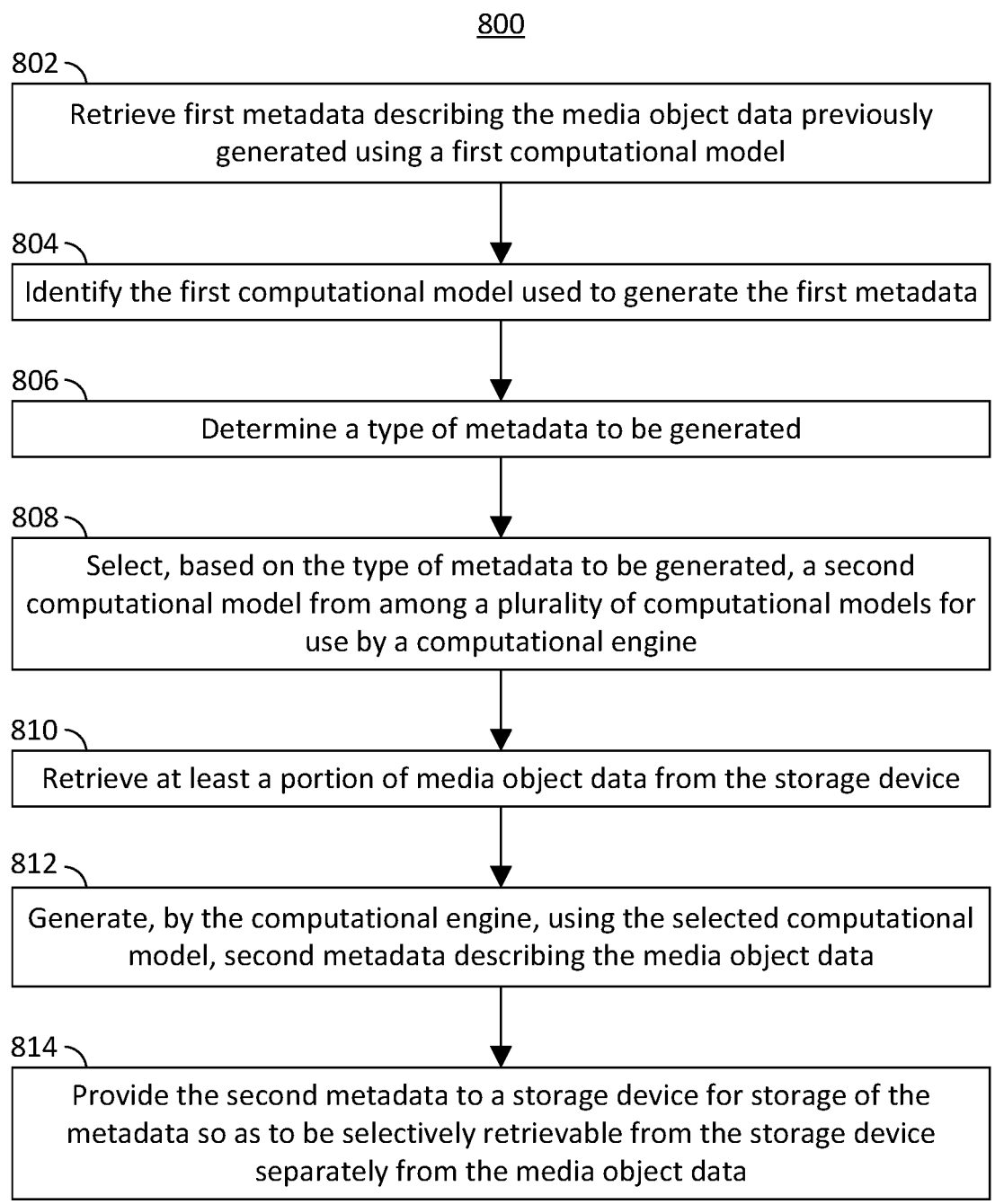
FIG. 8 is a flowchart representing another process for generating metadata describing a data object in accordance with some implementations of the disclosure.

FIG. 8 is a flowchart representing another process 800 for generating metadata describing a data object in accordance with some implementations of the disclosure. In some implementations, media object data that has already been processed using a first computational model to generate first metadata is processed again using a second computational model to generate additional or supplemental metadata. At 802, control circuitry 106 retrieves the first metadata describing the media object data previously generated using the first computational model. For example, control circuitry 806 may use query non-volatile storage 110 or metadata storage 400 using an SQL "SELECT" command, in response to which non-volatile storage 110 provides the first metadata. Alternatively, control circuitry 106 may access a file allocation table of non-volatile storage 110 to identify a memory location or memory address range at which the first metadata is stored and retrieve the first metadata from the identified location or address range.

At 804, control circuitry 106 identifies the first computational model used to generate the first metadata. For example, in an implementation, control circuitry 106 may analyze the type of metadata previously generated, or specific metadata fields contained within the first metadata with respect to one or more computational models, or an index of available computational models to identify a second computational model for processing the identified data type which produces the type of metadata or specific metadata fields contained within the first metadata. For example, if the first metadata contains fields describing faces and facial positions over time, control circuitry 106 determines that the first metadata was produced using a computational model configured to identify faces in video content.

At 806, control circuitry 106 determines a type of metadata to be generated. Control circuitry 106 may determine whether an updated version of the first computational model exists. For example, control circuitry 106 identifies a date and time at which the first computational model was compiled or when the data structure containing the first computational model was first made available. If an updated version of the first computational model exists, control circuitry 106 determines that metadata of the same type as the first metadata should be generated. Alternatively, control circuitry 106 may automatically select a type of metadata to supplement the first metadata or may receive input from a user identifying a particular type of metadata to be generated. For example, control circuitry 106 identifies the first computational model as an image processing model for identifying objects, such as faces, depicted in video frames. Control circuitry 106 then determines that metadata identifying additional characteristics associated with faces is to be generated, such as mood. Alternatively, control circuitry 106 determines that metadata describing spoken words within the video data is to be generated.

At 808, control circuitry 106 selects a computational model based on the determined type of metadata to be generated. For example, if control circuitry 106 determines that the type of metadata to be generated is the same as the type of the first metadata, indicating that an updated version of the first computational model exists, control circuitry 106 selects the updated computational model. Alternatively, if metadata of a different type is to be generated, control circuitry 106 selects a computational model configured to generate that type of metadata. For example, if metadata describing moods is to be generated, control circuitry 106 selects a computational model configured to process frames in which faces are identified to identify a mood. If metadata describing spoken words is to be generated, control circuitry 106 may select an audio processing computational model to process audio data of the entire video or of segments of the video containing faces, to identify segments containing spoken words within the video, and then using the same or a different computational model textualize the spoken words and/or analyze the content of the speech. Control circuitry 106 may, alternatively or in addition, select a text processing computational model to extract and/or process text, such as closed captioning, in or associated with the content media.

At 810, control circuitry 106 retrieves at least a portion of the media object data from non-volatile storage 110 based on the configuration of the selected computational model. For example, the first computational model identified faces in video content, and the selected computational model is configured to identify moods based on faces in video data. Rather than retrieve the entire video content from non-volatile storage 110, control circuitry 106 uses the first metadata generated by the first computational model to identify portions of the video content which contain faces for processing by the computational engine 116 using the selected computational model. Control circuitry 106 then retrieves only those identified portions of the video content.

At 812, computational engine 116 generates second metadata describing content in the media object data using the second computational model. At 814, control circuitry 106 provides the second metadata to non-volatile storage 110 for storage so as to be selectively retrievable from the storage device separately from the media object data using methods described above in connection with FIGS. 3 and 4. Thus, the metadata can be retrieved separately from the media object data, thereby enabling the process described above to retrieve only the metadata generated by the first computational model independently of the media object data.

Figure 9:
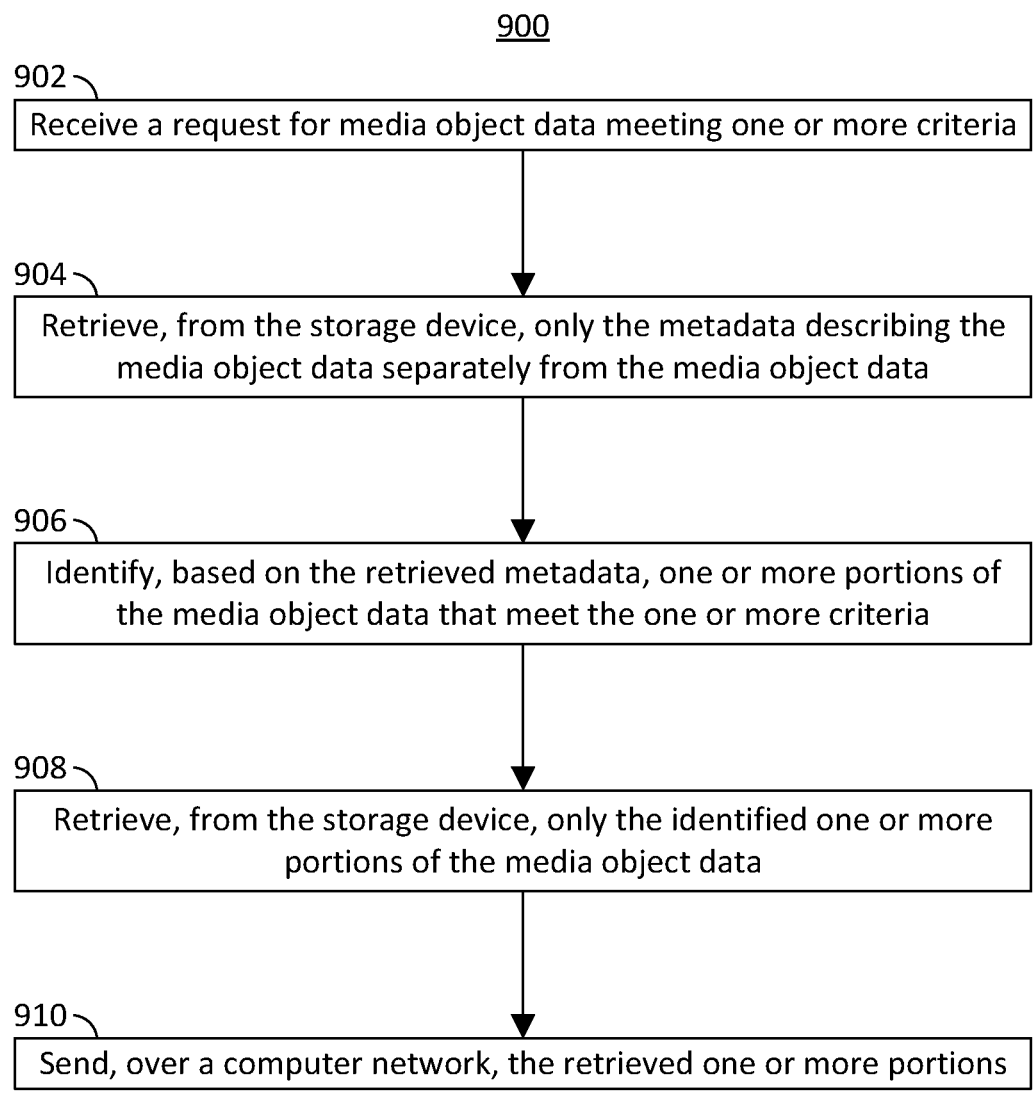
FIG. 9 is a flowchart representing a process for retrieving portions of a data object based on separately retrieved metadata describing the data object in accordance with some implementations of the disclosure.

FIG. 9 is a flowchart representing a process 900 for retrieving portions of a data object based on separately retrieved metadata describing the data object in accordance with some implementations of the disclosure. At 902, storage control device 102 receives a request from a host device for a media object meeting one or more criteria. For example, the media object is surveillance video and the host device requests video data containing human faces. At 904, storage control device 102 retrieves, from non-volatile storage 110, only the metadata describing the media object data. For example, storage control device 102 accesses a logically separable portion of the media object in which the metadata describing the surveillance video is stored and extracts, copies, or otherwise retrieves the metadata contained in the logically separable portion without retrieving any of the surveillance video data.

At 906, storage control device 102, using control circuitry 106, analyzes the metadata to identify portions of the media object data that meet the one or more criteria. For example, control circuitry 106 analyzes the metadata describing the surveillance video and identifies portions of the surveillance video which meet requested criteria—in the present example portions of the surveillance video that contain human faces. At 908, storage control device 102, retrieves only the identified portions of the media object data which contain objects meeting the requested criteria separately from other parts of the media object data that do not include portions containing objects meeting the requested criteria. For example, storage control device 102 retrieves only the portions of the surveillance video that contain human faces as identified based on the metadata. At 910, the retrieved one or more portions of the media object data are sent, over a computer network, to the host device. In an implementation, the identified portions containing objects meeting the requested criteria are sent to the host device over a computer network. However, other portions of media object data that fail to meet the requested criteria, such as those that do contain human faces, need not be sent.

Various implementations discussed in conjunction with FIGS. 1-9 are performed by various electronic components of one or more electronic circuits, such as but not limited to an integrated circuit, application-specific integrated circuit (ASIC), DSP, and/or the like. Various components discussed throughout this disclosure such as, but not limited to control circuitry and hardware accelerators (e.g., control circuitry 106 and hardware accelerator 312), and/or the like, are configured to include a set of electronic circuit components, and communicatively operate on one or more electronic circuits. Each electronic circuit is configured to include any of, but not limited to logic gates, memory cells, amplifiers, filters, and/or the like. Various implementations and components disclosed herein are configured to be at least partially operated and/or implemented by processor-executable instructions stored on one or more transitory or non-transitory processor-readable media.

While various implementations of the subject matter of the present disclosure have been shown and described herein, such implementations are provided by way of example only. Numerous variations, changes, and substitutions relating to implementations described herein are applicable without departing from the disclosure. It is noted that various alternatives to the implementations of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations must be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the processes depicted in FIG. 7, FIG. 8, and FIG. 9 do not necessarily require the particular order shown, or sequential order, to achieve desirable results. In certain implementations, multitasking and parallel processing may be advantageous. Other variations are within the scope of the following claims.

What is claimed is:

1. A method for storing and managing media object data, the method comprising:
   receiving, at a storage control device, media object data, the storage control device being located at a storage edge remotely from a host device and coupled to a storage device;
   identifying, at the storage control device, using control circuitry of the storage control device, a type of the media object data;
   selecting, at the storage control device, based on the identified type, a computational model from among a plurality of computational models for use by a computational engine of the storage control device;
   generating, by the computational engine, using the selected computational model, metadata describing the media object data;
   providing the generated metadata to the storage device for storage of the metadata so as to be selectively retrievable from the storage device separately from the media object data.

2. The method of claim 1, further comprising:
   retrieving input data interface parameters associated with the selected computational model, the input data interface parameters identifying a data format for which the selected computational model is configured;
   accessing the media object data at the storage edge using the input data interface parameters; and
   converting the media object data to the identified data format.

3. The method of claim 1, further comprising:
   retrieving, by the storage control device, hardware interface parameters associated with the selected computational model;
   applying the hardware interface parameters to a hardware interface;
   accessing, at the storage edge, the media object data from a first physical connection using the hardware interface; and
   storing the media object data and metadata in the storage device through a second physical connection using the hardware interface.

4. The method of claim 1, wherein the media object data is encrypted, the method further comprising:
   retrieving, by the storage control device, decryption parameters associated with the selected computational model; and
   decrypting, at the storage edge, the media object data using the decryption parameters.

5. The method of claim 1, wherein the media object data is retrieved from the storage device, the method further comprising;
   identifying the computational model used to generate the metadata, the computational model being a first computational model and the metadata being first metadata;
   selecting a second computational model that is different from the first computational model to generate second metadata that is different from the first metadata; and storing the second metadata to be selectively retrievable from the first metadata and from the media object data.

6. The method of claim 5, further comprising:
combining the first metadata and the second metadata to generate combined metadata; and
providing the combined metadata to the storage device for storage of the combined metadata so as to be selectively retrievable from the storage device separately from the media object data.

7. The method of claim 1, further comprising:
receiving, at the storage edge, from the host device, a request for media object data containing objects meeting one or more criteria.

8. The method of claim 7, further comprising, in response to the request for media object data containing objects meeting the one or more criteria:
retrieving, from the storage device, only the metadata describing the media object data separately from the media object data;
identifying, based on the retrieved metadata, one or more portions of the media object data that meet the one or more criteria;
retrieving, at the storage edge, only the identified one or more portions of the media object data from the storage device separately from other portions of the media object data; and
sending to the host device, over a computer network, retrieved portions of media object data containing objects meeting the one or more criteria.

9. The method of claim 1, further comprising:
generating a copy of the media object data; and
concurrently providing, by the storage control device, the media object data to the storage device for storage and providing the copy of the media object data to the computational engine for processing to generate metadata.

10. The method of claim 1, further comprising:
storing the media object data and the metadata in a logically separable manner so as to be selectively retrievable separately from one another.

11. A data storage controller, located at a storage edge remotely from a host device and coupled to one or more storage devices, the data storage controller comprising:
control circuitry local to the storage device configured to:
receive media object data for storage at the storage device; and
identify a type of the media object data; and
a computational engine associated with the control circuitry, the computational engine configured to:
select, based at least on the identified type, a computational model from among a plurality of computational models for use by the computational engine to generate metadata describing the media object data;
generate, using the selected computational model, metadata describing the media object data; and
provide the generated metadata to the storage device for storage of the metadata so as to be selectively retrievable from the storage device separately from the media object data.

12. The data storage controller of claim 11, wherein the control circuitry is further configured to:
retrieve input data interface parameters associated with the selected computational model, the input data interface parameters identifying a format for which the selected computational model is configured;
access the media object data at the storage edge using the input data interface parameters; and
convert the media object data to the identified data format.

13. The data storage controller of claim 11, wherein the control circuitry is further configured to:
retrieve hardware interface parameters associated with the selected computational model;
apply the hardware interface parameters to a hardware interface;
access the media object data at the storage edge through a first physical connection using the hardware interface; and
store the media object data and metadata in the storage device through a second physical connection using the hardware interface.

14. The data storage controller of claim 11, wherein the control circuitry is further configured to:
retrieve decryption parameters associated with the selected computational model; and
decrypt, at the storage edge, the media object data using the decryption parameters.

15. The data storage controller of claim 11, wherein the media object data is retrieved from the storage device, and wherein the control circuitry is further configured to:
identify the computational model used to generate the metadata, the computational model being a first computational model and the metadata being first metadata;
select a second computational model that is different from the first computational model to generate second metadata that is different from the first metadata; and
store the second metadata to be selectively retrievable from the first metadata and from the media object data.

16. The data storage controller of claim 15, wherein the control circuitry is further configured to:
combine the first metadata and the second metadata to generate combined metadata; and
provide the combined metadata to the storage device for storage of the combined metadata so as to be selectively retrievable from the storage device separately from the media object data.

17. The data storage controller of claim 11, wherein the control circuitry is further configured to:
receive, from the host device, a request for media object data containing objects meeting one or more criteria.

18. The data storage controller of claim 17, wherein the control circuitry is further configured, in response to the request for media object data containing objects meeting one or more criteria, to:
retrieve, from the storage device, only the metadata describing the media object data separately from the media object data;
identify, based on the retrieved metadata, one or more portions of the media object that meet the one or more criteria;
retrieve only the identified one or more portions of the media object data from the storage device separately other portions of the media object data; and
send to the host device, over a computer network, retrieved portions of media object data containing objects meeting the one or more criteria.

19. The data storage controller of claim 11, wherein the control circuitry is further configured to:
generate a copy of the media object data; and
concurrently provide the media object data to the storage device for storage and provide the copy of the media object data to the computational engine for processing to generate metadata.

20. The data storage controller of claim 11, wherein the control circuitry is further configured to store the media object data and the metadata in a logically separable manner so as to be selectively retrievable separately from one another.

\* \* \* \* \*